Dec. 26, 1967  W. H. VAN DEBERG  3,360,079
ENERGY ABSORBER AND METHOD
Original Filed Feb. 21, 1963
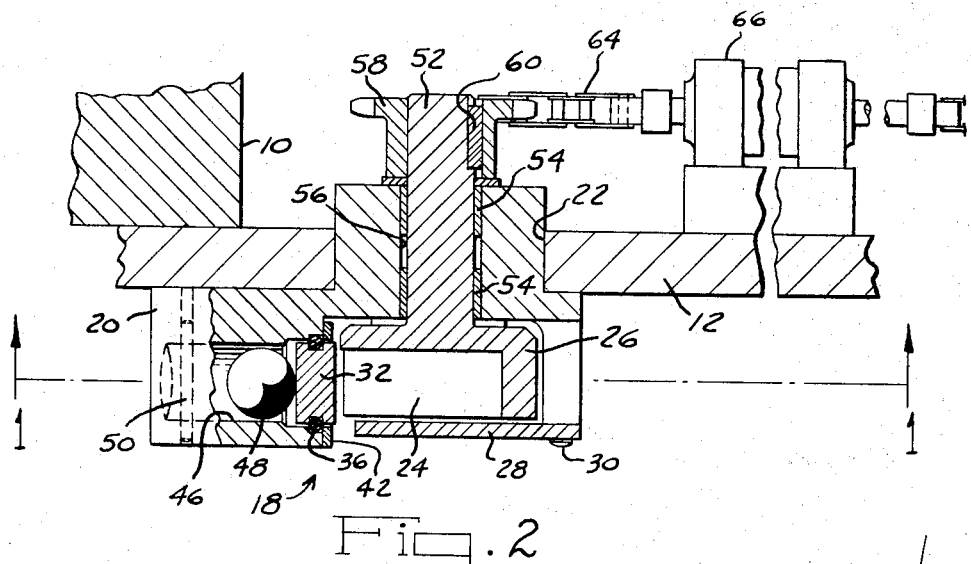
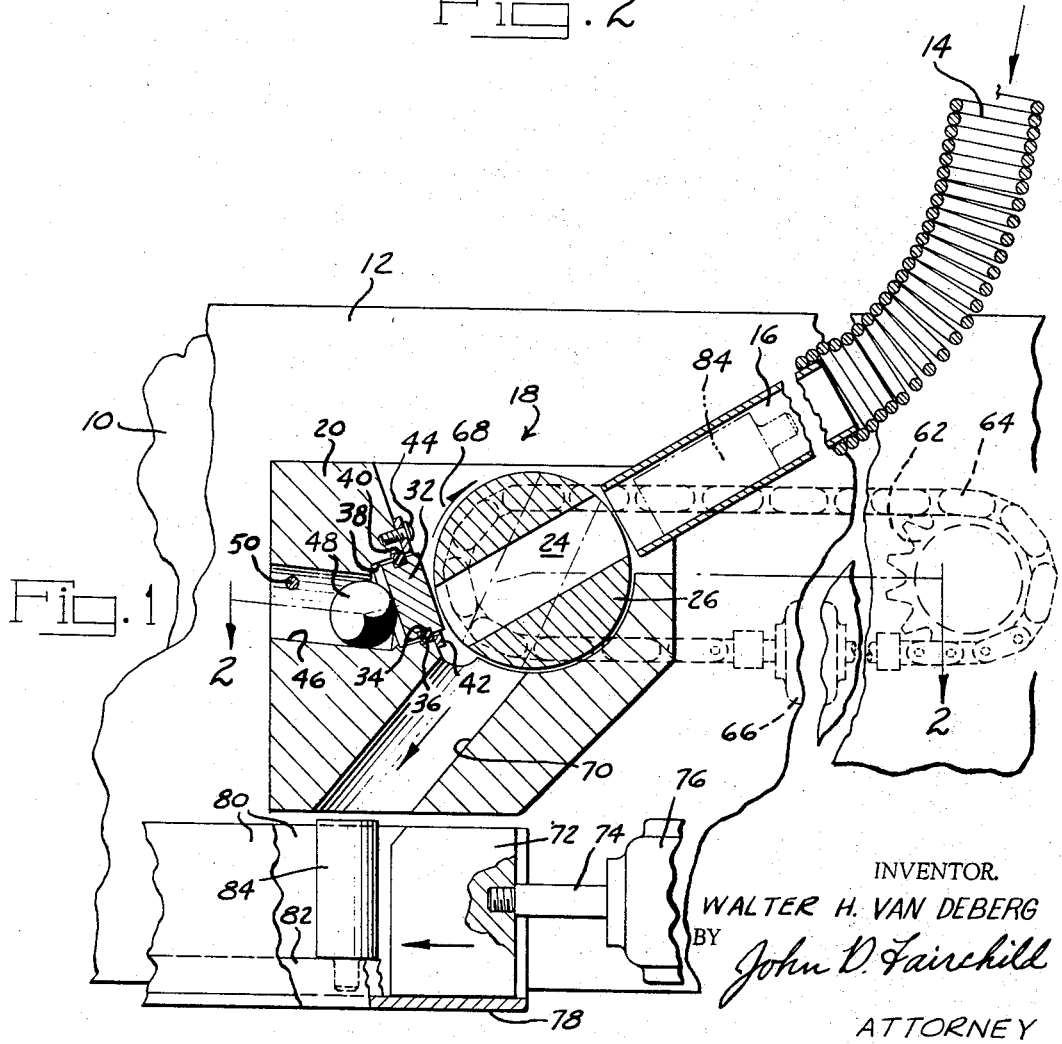
INVENTOR.
WALTER H. VAN DEBERG
BY John D. Fairchild
ATTORNEY United States Patent Office 3,360,079
Patented Dec. 26, 1967

3,360,079
ENERGY ABSORBER AND METHOD
Walter H. Van Deberg, Berkley, Mich., assignor to Earl A. Thompson Manufacturing Company, a corporation of Michigan
Continuation of application Ser. No. 260,187, Feb. 21, 1963. This application Mar. 5, 1965, Ser. No. 443,746
23 Claims. (Cl. 188—1)

This application is a continuation of my application Ser. No. 260,187 filed Feb. 21, 1963, now abandoned.

This invention relates to workpiece or article handling, and more particularly to apparatus for absorbing kinetic energy, so as to control the subtraction of forward motion from a traveling article.

In modern mass production machinery environments, automated article handling frequently involves moving wokpieces individually to a predetermined location. For instance, parts may be dispensed singly from storage or other sources and then travel via chutes or ways under the influence of gravitational, electromagnetic, pneumatic or other forces to work performing, assembling, testing, packaging, handling or other such machine. The faster the article moves, the more efficient the operation. Thus relatively high velocities frequently are encountered.

Additionally, the article must be stopped at the predetermined location quickly and precisely. Ordinary stationary or spring loaded strike plates, while desirably simple and long lasting, cause rebound of the arrested article and require time for the article to dissipate its energy and come to rest before the article may be further handled by other automatic machinery. Bouncing is unacceptable with irregularly shaped articles because it prevents their being maintained in a predetermined orientation.

Automatic catching devices, on the other hand, are not entirely satisfactory. For instance, strong grippers which snap closed on a passing article, backstops which shoot into position after an article passes to prevent uncontrolled rebounds, and like arrangements all require complex, precision-timed tooling involving considerable expense. Furthermore, such devices ordinarily must be retracted to release the stopped article prior to operation of subsequent handling equipment.

Further problems arise from static yieldable braking devices often interposed in chutes or troughs which prevent articles from traveling at desired speeds, exhibit slow down characteristics which vary with dimension tolerances of the articles, do not preclude bouncing at the destination, and do not attempt to get at the source of these problems.

Accordingly, it is an object of the present invention to provide an improved motion arrester of extremely simple and rugged design which avoids the above-noted difficulties.

Another object of this invention is to provide an improved device for absorbing energy from a traveling article to retard and stop it.

Another object is to provide an improved arrangement for absorbing kinetic energy as a moving article is stopped to prevent return of energy which would produce undesirable bouncing, preventing the article from quickly coming to rest.

Another object is to provide, in an article handling machine, an improved arrangement for receiving articles singly from a remote source and placing them quickly and properly oriented in a desired location ready for further manipulation by additional handling equipment.

Further objects and advantages of the present invention will be apparent from the following detailed description, with reference to the accompanying drawings in which like reference characters refer to the same parts throughout the several views, and in which:

FIG. 1 is a sectional elevational view on line 1—1 of FIG. 2 showing one illustrative form of the energy absorber of this invention; and FIG. 2 is a sectional view on line 2—2 of FIG. 1 showing further details of the device.

In general, this invention is concerned with articles having some resilience or elasticity. That is, it concerns articles or workpieces which will bounce to some extent upon striking another object.

Such a resilient article, when in motion, has kinetic energy capable of performing work. One form of such energy is momentum energy, a product of the mass of an article and its speed.

Such energy poses many problems in article handling. Prior attempts to subtract it and bring a moving mass quickly to rest without bouncing have not provided fully satisfactory answers. The device of this invention supplies a successful solution by phenomenon instantaneously transmitting energy from the resilient article to a dummy mass where it may be absorbed or dissipated in any desired manner, and leaving only the desired momentum energy, if any, in the article.

In the drawings, a portion 10 of a production machine has attached thereto a plate 12 upon which the energy absorber of this invention may be secured. In the upper right-hand portion of FIG. 1, a flexible chute 14 constitutes a source from which articles or workpieces may be moved singly under the influence of a force such as gravity to a tubular extension 16 through which the article may travel to the energy absorber of this invention.

The energy absorber, generally designated 18, may comprise a framework 20 received in an aperture 22 in the plate 12, and secured there by suitable fastener means, not shown. The approach path formed by the tube 16 is continued and terminated by a diametrical slot 24 in a rotary receiver or oscillating member 26. The sides of the final zone 24 of the travel path may be closed by the walls of the oscillating member 26 and by a stationary nonrotating plate 28 secured as at 30 to the framework 20. The end of the receiver adjacent the lower end of the approach tube 16 is open to admit the article to the zone 24.

The remaining side of the zone 24 is blocked by a resilient or elastic strike plate or abutment member 32 mounted on the framework 20. Thus the zone 24 constitutes a trap having one side open to admit the article, one side open to discharge the article, as will be explained, and also defines a terminal location from which successively presented articles may be withdrawn for further manipulation by automatic handling apparatus.

The abutment member or strike plate 32 may comprise a disc shaped plate or body having an annular groove 34 therearound to receive an O-ring 36 of yieldable material by which the strike plate is supported. The disc 32 may be received in an annular opening 38 in the framework 20, which opening has an enlarged shoulder portion 40 for receiving the outer diameter of the O-ring 36. A light apertured retainer plate 42 for retaining the O-ring 36 in against the shoulder 40 may be secured to the framework 20 by a suitable fastener 44. Thus the plate 32 is yieldingly or elastically supported in the framework. The striking face of the abutment disc 32, it will be observed, is not positioned at right angles to the side wall of the travel termination zone 24, but is angled slightly thereto and located eccentrically thereof. As shown in FIG. 1 the center of the cross section of the disc 32 is in prolongation of the line designating the top of the cross section of the chamber 24. Therefore the edge of the bottom of the cylindrical article 84 which is to be controlled will strike the disc. The contact between the body 84 and the disc 32 will therefore be a point. This point of contact on the body is traveling approximately along the line representing the top of the chamber 84 and its line of travel will therefore pass through the approximate center of the cross section of the disc, which is, in effect, its center of gravity.

The opening 38 continues on the other side of the abutment 32 in a direction away from the travel path of the approaching articles. This continuation may comprise a bore 46 in the framework 20 to form a mounting for a displaceable dummy mass member 48. The mass member 48 may conveniently be a ball free to roll to and fro in the bore 46. The opposite end of the bore may be closed by suitable means, such as a cross pin 50, to prevent escape of the ball 48 from its channel. The bore 46 slopes downward to the plate 32 so that the ball will return to rest against the back face of the strike plate 32.

The receiver 26 may be generally circular in configuration, and may include a concentric, integral shaft 52 which may be journalled in bushings 54 located in a bore 56 extending generally horizontally through the portion of the framework 20 which is mounted in the aperture 22 of the plate 12. The outer extremity of the shaft 52 on the opposite side of the plate 12 may have a sprocket 58 keyed at 60. A second sprocket 62 also mounted on the back of the plate may support a roller chain 64 for turning the sprocket 58. The chain 64 may be reciprocated to-and-fro by suitable drive means such as a double-acting piston type fluid motor 66 secured to the plate 12. Reciprocation of the chain 64 by the motor 66 will rotate the receiver 26 back and forth to let the article drop out of the arresting zone 24.

Below the receiver 26, an additional passageway may be formed by a bore 70 in the frame 20. Below the bottom of the bore 70, a transfer block 72 may be reciprocated by the piston rod 74 of a second fluid motor 76. The block 72 may reciprocate on a slideway 78 between side guide walls 80. A pair of parallel tracks 82 may be located on the slide 78 for guiding the movement of an irregularly shaped workpiece. After the workpiece has travelled from the bore 70 to the tracks 82 it may be moved to the left by the transfer block 72 into position to be handled by manipulating mechanism on the machine 10.

An article having positive resiliency illustrated, by way of example only, at 84 in the drawings may comprise a generally cylindrical elongate body having a narrow neck portion concentrically extending a short distance from one end. In FIG. 1, such an article is illustrated in phantom lines on its travel path in the approach tube 16 with the narrow neck up. In the lower portion of the figure, the article 84 is illustrated in full lines in an inverted position resting on the trackways 82 with the narrow neck portion down and between the tracks 82, in a position ready to be translated to the left by the transfer member 72.

In operation a workpiece or article 84, with the neck portion trailing, descends rapidly by gravity or other forces along the path defined by the members 14, 16 and 26. As the article reaches the end of the path in the zone 24, its edge strikes the abutment 32 which abruptly stops the article, and instantaneously transmits energy to the ball 48 to move the ball away from the rear of the abutment 32. The ball may strike the pin 50 located above the center of gravity of the ball, so that the ball may rebound, then ricochet up and down in the bore 46 to dissipate the energy it has absorbed.

Momentum energy thus substracted from the abruptly stopped article 84 is not available to cause undesirable bouncing of the article itself. Since the abutment member 32 is angled slightly to the path of travel, and a line through the center of gravity of the article 84 and that of the ball 48 is not in direct alignment with the travel path, the article 84 may in the disclosed design experience a slight rebound; however, such rebound will be directed downwardly against the bottom wall of the zone 24 whereupon the article will bounce up and down only in the confined zone in lateral directions but will not rebound longitudinally back out of zone 24.

Therefore, immediately after the article strikes the abutment member 32, the article will be dead and will tend to fall vertically, and if the bottom of the passage 24 is open, the article 84 can drop out on the slide 78. The reciprocating motor 66 may be actuated at this time to rotate the receiver 26 to open the bottom of the passage. If the receiver is rotated clockwise, as indicated by the arrow 68 through approximately 150° the article 84 will be reversed end for end and will fall under the influence of gravity to the slide 78 with the neck down. After the article has fallen from the zone 24, the receiver 26 may be returned to its normal position by operation of the motor 66 preparatory to the reception of another article from the source 14. As the article 84 lands on the trackways 82, leftward motion of the transfer block 72 driven by the motor 76 moves it into the operating portion of the machine. Thereafter, retraction of the block 72 places this mechanism in position to receive a subsequent article from the passage 70.

Thus an energy absorber has been disclosed which brings an article traveling at considerable velocity to an abrupt, sudden stop where it is trapped in a desired zone. The energy absorbing mass member dissipates kinetic energy from the article and prevents the article from bouncing backward along its travel path out of the desired zone. Consequently, the article may be immediately manipulated by other automatic mechanisms, for example the rotating receiver which inverts it before delivering it to another handling zone.

By controlling the angle of the strike plate 32, the position of the center of gravity of the mass member 48 in relation to the center of gravity of the article 84 at the time of impact, the mass of the ball 48 relative to the mass of an article, and the like, the desired change in the article's energy may be effected. For instance, the total energy of motion (leaving unchanged the potential energy of the body due to gravity and the position of the article 84 in the machine) could be directly subtracted from the article and added to the mass member bringing the article to a dead stop. Or, in other circumstances where such total transfer of energy would not be desired, as in the disclosed embodiment, the speed component of the velocity energy may be diminished to a desired extent and the direction of the velocity energy changed at will by angling the strike plate to the path of travel. Furthermore, it will be obvious that the intermediate transmitting plate 32 may be omitted entirely in given designs, and the article may be allowed to strike the mass member 48 directly.

While the above described embodiment constitutes a preferred mode of carrying out this invention, many other forms might be adopted within the scope of the actual invention, which is variously claimed as:

1. In an arrangement for stopping with reduced rebound a resilient article moving along a path, a one-way energy transfer system comprising in combination, a stationary support, an abutment, a receiver defining a path for an article moving to strike the abutment, the abutment being substantially stationary with respect to the path but capable of slight movement in the general direction of the path, the abutment having an impact face facing the article and inclined to the direction of the end of the path at the abutment and having its center of gravity in line with the line of movement of the uppermost point on the article, a passageway upwardly inclined from the side of the abutment opposite the impact face, and an energy absorbing ball whose mass substantially equals the mass of the article adapted to roll in the passageway and normally resting against the abutment for receiving from the abutment kinetic energy transferred from the article to the abutment upon impact of the article therewith and for returning energy to the abutment after a time interval, a resilient and energy-absorbing O-ring for supporting the abutment on the support and means for tipping the receiver during said time interval to reverse the article end-for-end and remove it from the abutment.

2. In an arrangement for stopping with reduced rebound a resilient article moving along a path, a one-way energy transfer system comprising in combination, a stationary support, an abutment, a receiver defining a path for an article moving to strike the abutment, the abutment being substantially stationary with respect to the path but capable of slight movement in the general direction of the path, the abutment having an impact face facing the article and inclined to the direction of the end of the path at the abutment and having its center of gravity in line with the line of movement of the uppermost point on the article, a passageway upwardly inclined from the side of the abutment opposite the impact face, and an energy absorbing ball adapted to roll in the passageway and normally resting against the abutment for receiving from the abutment kinetic energy transferred from the article to the abutment upon impact of the article therewith and for returning energy to the abutment after a time interval, a movement-limiting and energy-absorbing connection between the abutment and the support and means for tipping the receiver during said time interval to reverse the article end-for-end and remove it from the path.

3. In an arrangement for stopping with reduced rebound a resilient article moving along a path, a one-way energy transfer system comprising in combination, a stationary support, an abutment, a receiver defining a path for an article moving to strike the abutment, the abutment being substantially stationary with respect to the path but capable of slight movement in the general direction of the path, the abutment having an impact face facing the article and inclined to the direction of the end of the path at the abutment and having its center of gravity in line with the line of movement of the uppermost point on the article, a passageway upwardly inclined from the side of the abutment opposite the impact face, and an energy-absorbing ball adapted to roll in the passageway and normally resting against the abutment for receiving from the abutment kinetic energy transferred from the article to the abutment upon impact of the article therewith and for returning energy to the abutment after a time interval, a movement-limiting and energy-absorbing connection between the abutment and the support and means for removing the article from the abutment and from the path during said time interval.

4. In an arrangement for stopping with reduced rebound a resilient article moving along a path, a one-way energy transfer system comprising in combination, a stationary support, an abutment, means defining a path for an article moving to strike the abutment, the abutment being substantially stationary with respect to the path but movable slightly in the general direction of the path, the abutment having its center of gravity in the line of force exerted on the abutment by the article, a passageway upwardly inclined from the side of the abutment opposite the impact face, and an energy-absorbing mass whose mass substantially equals the mass of the article adapted to move up and down in the passageway and normally resting against the abutment for receiving from the abutment kinetic energy transferred from the article to the abutment upon impact of the article therewith and for returning energy to the abutment after a time interval, a movement-limiting and energy-absorbing connection between the abutment and the support, the system including means for permitting the article to move away from the abutment and out of said path during said time interval.

5. In an arrangement for stopping with reduced rebound a resilient article moving along a path, a one-way energy transfer system comprising in combination, a stationary support, an abutment, means defining a path for an article moving to strike the abutment, the abutment being substantially stationary with respect to the path but movable slightly in the general direction of the path, the abutment having its center of gravity in the line of force exerted on the abutment by the article, a passageway upwardly inclined from the side of the abutment opposite the impact face, and an energy-absorbing mass adapted to move up and down in the passageway and normally resting against the abutment for receiving from the abutment kinetic energy transferred from the article to the abutment upon impact of the article therewith and for returning energy to the abutment after a time interval, a movement-limiting and energy-absorbing connection between the abutment and the support, the system including means for permitting the article to move away from the abutment and out of said path during said time interval.

6. In an arrangement for stopping with reduced rebound a resilient article moving along a path, a one-way energy transfer system comprising in combination, an abutment, means defining a path for an article moving to strike the abutment, the abutment being substantially stationary with respect to the path but capable of slight movement in the general direction of the path, the abutment having its center of gravity in the line of force exerted by the article on the abutment, a body whose mass substantially equals the mass of the article normally resting in energy transfer relationship with the abutment for receiving from the abutment kinetic energy transferred from the article upon impact, the body being movable up and down through a vertical distance to store and dissipate energy received from the abutment, and means for dissipating from the abutment without return to the article kinetic energy returned from the body to the abutment.

7. In an arrangement for stopping with reduced rebound a resilient article moving along a path, a one-way energy transfer system comprising in combination, an abutment, means defining a path for an article moving to strike the abutment, the abutment being substantially stationary with respect to the path but capable of slight movement in the general direction of the path, a body normally resting in energy transfer relationship with the abutment for receiving from the abutment kinetic energy transferred from the article upon impact, the body being movable up and down through a vertical distance to store and dissipate energy received from the abutment, and means for dissipating from the abutment without return to the article kinetic energy returned from the body to the abutment.

8. In an arrangement for stopping with reduced rebound a resilient article moving along a path, a one-way energy transfer system comprising in combination, a stationary support, an abutment, means defining a path for an article moving to strike the abutment, the abutment being substantially stationary with respect to the path but capable of slight movement in the general direction of the path, the abutment having its center of gravity in the line of force exerted by the article on the abutment, a body normally resting in energy transfer relationship with the abutment for receiving from the abutment kinetic energy transferred from the article upon impact, the body being movable up and down through a vertical distance to store and dissipate energy received from the abutment, and means for transferring from the abutment to the support without return to the article kinetic energy returned from the body to the abutment.

9. In an arrangement for stopping with reduced rebound a resilient article moving along a path, a one-way energy transfer system comprising in combination, a stationary support, an abutment, means defining a path for an article moving to strike the abutment, the abutment being substantially stationary with respect to the path but capable of slight movement in the general direction of the path, the abutment having its center of gravity in the line of force exerted by the article on the abutment, a body normally resting in energy transfer relationship with the abutment for receiving from the abutment kinetic energy transferred from the article upon impact, the body being movable up and down through a vertical distance to store and dissipate energy received from the abutment, and an elastomeric O-ring for transferring from the abutment to the support without return to the article kinetic energy returned fom the body to the abutment.

10. In an arangement for stopping with reduced rebound resilient article moving along a path, a one-way energy transfer system comprising in combination, means defining a path for an article moving to a stopping station, an energy transfer body having a mass substantially equal to the mass of the article normally resting at the stopping station in position to receive kinetic energy from the article when it reaches the stopping station, the body being movable through a vertical distance by energy received from the article to convert such received energy to potential energy, and being returnable after a time interval to its normal position under the influence of such potential energy and means for preventing return to the article of kinetic energy from the returning body.

11. In an arrangement for stopping with reduced rebound a resilient article moving along a path, a one-way energy transfer system comprising in combination, means defining a path for an article moving to a stopping station, an energy transfer body normally resting at the stopping station in position to receive kinetic energy from the article when it reaches the stopping station, the body being movable through a vertical distance by energy received from the article to convert such received energy to potential energy, and being returnable after a time interval to its normal position under the influence of such potential energy and means for preventing return to the article of kinetic energy from the returning body.

12. In an arrangement for stopping with reduced rebound a resilient article moving along a path, a one-way energy transfer system comprising in combination, means defining a path for an article moving to a stopping station, an energy transfer body normally resting at the stopping station in position to receive kinetic energy from the article when it reaches the stopping station, the body being movable through a distance by energy received from the article to convert such received energy to potential energy, and being returnable after a time interval to its normal position under the influence of such potential energy and means for preventing return to the article of kinetic energy from the returning body.

13. A motion control device comprising in combination a movable article receiver having a normal position and having a passage therethrough, means for directing into one end of said passage an elastic article to be controlled having a cylindrical forward end portion terminating in a circular edge, an energy transferring strike body having an impact suface adjacent the other end of the passage when the receiver is in normal position and having a second surface opposite the impact surface, the mass of the strike body being substantially equal to the mass of the controlled body, means for yieldingly supporting the strike body offset from the passage and with its impact surface at an angle to the axis of the passage so that the article strikes the impact surface with a point on its edge moving along a line which substantially passes through the center of gravity of the strike body, an energy-absorbing body normally in contact with the second surface of the strike body the mass of the absorption body being substantially equal to the mass of the strike body, said absorption body being supported to move away from the strike body when the strike body is struck by the body to be controlled and to return automatically into contact with the strike body, and means for moving the receiver to move its passage away from the strike body during the time the absorption body is away from the strike body to remove the controlled body from the passage.

14. An arrangement for suddenly arresting motion of a traveling resilient article with reduced rebound of the article including a one-way energy transfer system comprising in combination abutment means which is substantially stationary with respect to the path of the article and placed to be struck by the article traveling along its path, means in energy-transfer relationship to the abutment for receiving kinetic energy of the article from the abutment upon impact of the article with the abutment and for returning energy after a time interval to the abutment, and means for removing the article from contact with the abutment means during such time interval.

15. The method of controlling the motion of an article which includes moving the article along a path into a passage and against an energy transfer body whose mass substantially equals the mass of the article to transfer substantially the entire energy of motion of the article to the body without significant rebound, and moving the passage relative to the article to remove the article from the passage.

16. The method of stopping and positioning an article moving along a path which includes suddenly transferring kinetic energy from the body to a mass which receives such energy and dissipates such energy after a time interval, and moving the article out of said path and placing it in a predetermined orientation during such time interval.

17. The method of stopping with diminished rebound an article moving along a path which includes suddenly transferring kinetic energy of motion along the path to a mass which converts such kinetic energy to potential energy then re-converts such potential energy to kinetic energy after a time interval, and moving said article out of said path during such time interval.

18. The method of stopping with diminished rebound an article moving along a path which includes suddenly transferring kinetic energy of motion along the path to a mass which converts such kinetic energy to potential energy then re-converts such potential energy to kinetic energy after a time interval, and transferring such last-mentioned kinetic energy to an energy dissipating device without returning kinetic energy to the article.

19. The method of controlling the motion of each of a series of articles which includes moving the articles successively along a path, suddenly stopping the foremost article of the series by removing kinetic energy from the article, transferring such kinetic energy to a cyclically operable energy storing and releasing device, removing the article from said path during the time between the storing and releasing of energy by said device, and successively moving other articles of the series as aforesaid.

20. The method of controlling the motion and orientation of an article which includes moving the article along a path, suddenly stopping the article by removing kinetic energy from the article, transferring such kinetic energy to a mass, removing the article from said path and changing its orientation, and subsequently releasing from the mass the energy transferred from the article.

21. The method of controlling the motion of an article which includes moving the article along a path, suddenly stopping the article by removing kinetic energy from the article, transferring such kinetic energy to an energy storing device, removing the energy from the storing device and dissipating such energy and removing the article from said path during the time between the storing of energy in the storing device and dissipation of energy therefrom.

22. The method of controlling the motion of an article which includes moving the article along a path, suddenly stopping the article by removing kinetic energy from the article, transferring the energy to an energy storing device by raising such device, receiving and absorbing the kinetic energy from said device while lowering the device while dissipating energy therefrom and removing the article from the path during the interval between the start of the raising and the finish of the lowering of the device.

23. The method of controlling the motion of an article which includes moving the article along a path to strike an energy transfer body, transferring the kinetic energy from the article through the transfer body to an energy absorbing body, moving the absorbing body away from the transfer body by converting the kinetic energy of the absorbing body to potential energy, returning the absorbing body to the transfer body while re-converting its potential energy to kinetic energy, absorbing the last mentioned kinetic energy in the transfer body and moving the article out of said path during the time the absorbing body is away from the transfer body.

References Cited

UNITED STATES PATENTS

| | | | |
|---|---|---|---|
| 2,155,052 | 4/1939 | Byland | 188—1 |
| 2,200,028 | 5/1940 | Kudo | 73—11 |
| 2,937,865 | 5/1960 | Patterson | 73—12 X |
| 3,106,834 | 10/1963 | Parstorfer | 73—12 |

DUANE A. REGER, *Primary Examiner.*